(12) United States Patent
Kumar-Mayernik et al.

(10) Patent No.: US 11,106,512 B2
(45) Date of Patent: Aug. 31, 2021

(54) SYSTEM AND METHOD FOR CONTAINER PROVENANCE TRACKING

(71) Applicant: VMware, Inc., Palo Alto, CA (US)

(72) Inventors: Nisha Kumar-Mayernik, Tualatin, OR (US); Malini Bhandaru, San Jose, CA (US); John Hawley, Hillsboro, OR (US); Darren Hart, Portland, OR (US); Tim Pepper, Tigard, OR (US)

(73) Assignee: VMware, Inc., Palo Alto, CA (US)

( * ) Notice: Subject to any disclaimer, the term of this patent is extended or adjusted under 35 U.S.C. 154(b) by 130 days.

(21) Appl. No.: 16/522,596

(22) Filed: Jul. 25, 2019

(65) Prior Publication Data

US 2020/0183766 A1    Jun. 11, 2020

Related U.S. Application Data

(60) Provisional application No. 62/777,018, filed on Dec. 7, 2018.

(51) Int. Cl.
| | |
|---|---|
| *G06F 9/54* | (2006.01) |
| *G06F 16/18* | (2019.01) |
| *H04L 9/32* | (2006.01) |
| *H04L 9/06* | (2006.01) |
| *G06F 40/169* | (2020.01) |

(52) U.S. Cl.
CPC .......... *G06F 9/545* (2013.01); *G06F 16/1805* (2019.01); *G06F 40/169* (2020.01); *H04L 9/0643* (2013.01); *H04L 9/3247* (2013.01); *H04L 2209/38* (2013.01)

(58) Field of Classification Search
CPC .... G06F 9/545; G06F 16/1805; G06F 40/169; H04L 2209/38; H04L 9/3239; H04L 9/3247; H04L 9/0643
See application file for complete search history.

(56) References Cited

U.S. PATENT DOCUMENTS

| | | | |
|---|---|---|---|
| 2002/0042687 A1* | 4/2002 | Tracy | H04L 63/30 702/119 |
| 2002/0062451 A1* | 5/2002 | Scheidt | G06Q 20/02 726/7 |
| 2008/0189287 A1* | 8/2008 | Traub | G06F 21/6218 |
| (Continued) | | | |

OTHER PUBLICATIONS

Pasat, Simina, "Introducing GitHub Package Registry", retrieved from the internet https://github.blog/2019-05-10-introducing-github-package-registry/, The Github Blog, 7 pages, May 10, 2019.

(Continued)

*Primary Examiner* — Tuan C Dao
(74) *Attorney, Agent, or Firm* — Loza & Loza, LLP

(57) ABSTRACT

A system and computer-implemented method for container provenance tracking uses a build instruction file of a container image to output a new provenance document associated with the container image for distribution. For each file system layer of the container image specified in the build instruction file, an existing provenance document for the file system layer is inserted into the new provenance document. If there is no existing provenance document, information about each software component included in the file system layer is retrieved and inserted into the new provenance document.

20 Claims, 6 Drawing Sheets

(56) References Cited

U.S. PATENT DOCUMENTS

| | | | | |
|---|---|---|---|---|
| 2008/0270977 A1* | 10/2008 | Nucci | ............... | G06F 3/0482 |
| | | | | 717/105 |
| 2009/0106549 A1* | 4/2009 | Mohamed | ........... | G06F 21/6218 |
| | | | | 713/156 |
| 2009/0227274 A1* | 9/2009 | Adler | ...................... | H04L 63/20 |
| | | | | 455/466 |
| 2017/0249128 A1* | 8/2017 | Fojtik | ....................... | G06F 8/71 |
| 2017/0255462 A1* | 9/2017 | Azagury | ............. | G06F 9/30181 |
| 2019/0065232 A1* | 2/2019 | Do | ...................... | H04L 43/0817 |
| 2019/0372850 A1* | 12/2019 | Fandli | ................. | H04L 41/0893 |

OTHER PUBLICATIONS

Lardinois, Frederic, "GitHub gets a package registry", retrieved from the internet https://techcrunch.com/2019/05/10/github-gets-a-package-registry/, The Github Blog, 3 pages, May 10, 2019.

Kumar, Nisha; Pepper Tim, "The Tern Project: Re-evaluate your Container Supply Chain," VMware Open Source Technology Center, Jan. 29, 2018.

* cited by examiner

SYSTEM AND METHOD FOR CONTAINER PROVENANCE TRACKING

CROSS REFERENCE TO RELATED APPLICATIONS

This application claims the benefit of U.S. Provisional Patent Application No. 62/777,018, filed Dec. 7, 2018, which is incorporated herein by reference.

BACKGROUND

Containers are widely used to execute various applications on a host computer. A container provides for the isolation of a group of processes from the others on an operating system. By making use of existing operating system functionality (such as Linux namespaces), containers maintain their own private view of the operating system, file system structure, and network interfaces. Containers share the operating system kernel with other processes, but can be constrained to some extent to use an amount of resources such as the central processing unit (CPU), random access memory (RAM), or input/output (I/O) devices. Containers have proven advantageous because they typically have a small system "footprint". That is, containers provide a relatively thin encapsulation layer above and beyond any applications contained therein. Consequently, instantiation and deployment of containers is relatively quick.

Containers are rapidly gaining in popularity as the mode for distributing and deploying software, because of the versatility, higher packing density on host nodes, fast launch time, and declarative definition. However, containers may include various software packages without much information about the software packages. Wary DevOps and security teams want and need to know about the software packages that are wrapped in a container, both to ensure reproducibility and security.

SUMMARY

A system and computer-implemented method for container provenance tracking uses a build instruction file of a container image to output a new provenance document associated with the container image for distribution. For each file system layer of the container image specified in the build instruction file, an existing provenance document for the file system layer is inserted into the new provenance document. If there is no existing provenance document, information about each software component included in the file system layer is retrieved and inserted into the new provenance document.

A computer-implemented method for container provenance tracking in accordance with an embodiment of the invention comprises receiving a build instruction file for a container image that includes multiple file system layers; for each file system layer of the container image specified in the build instruction file: when a provenance document exists for the file system layer of the container image being processed, inserting the provenance document into a new provenance document for the container image, and when a provenance document does not exist for the file system layer of the container image being processed, retrieving information about each software component included in the file system layer of the container image and inserting the information about each software component into the new provenance document; inserting the build instruction file into the new provenance document in a structured text format; and outputting the new provenance document as a finalized provenance document associated with the container image for distribution. In some embodiments, the steps of this method are performed when program instructions contained in a non-transitory computer-readable storage medium are executed by one or more processors.

A system in accordance with an embodiment of the invention comprises memory and at least one processor configured to receive a build instruction file for a container image that includes multiple file system layers; for each file system layer of the container image specified in the build instruction file: when a provenance document exists for the file system layer of the container image being processed, insert the provenance document into a new provenance document for the container image, and when a provenance document does not exist for the file system layer of the container image being processed, retrieve information about each software component included in the file system layer of the container image and inserting the information about each software component into the new provenance document; insert the build instruction file into the new provenance document in a structured text format; and output the new provenance document as a finalized provenance document associated with the container image for distribution.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
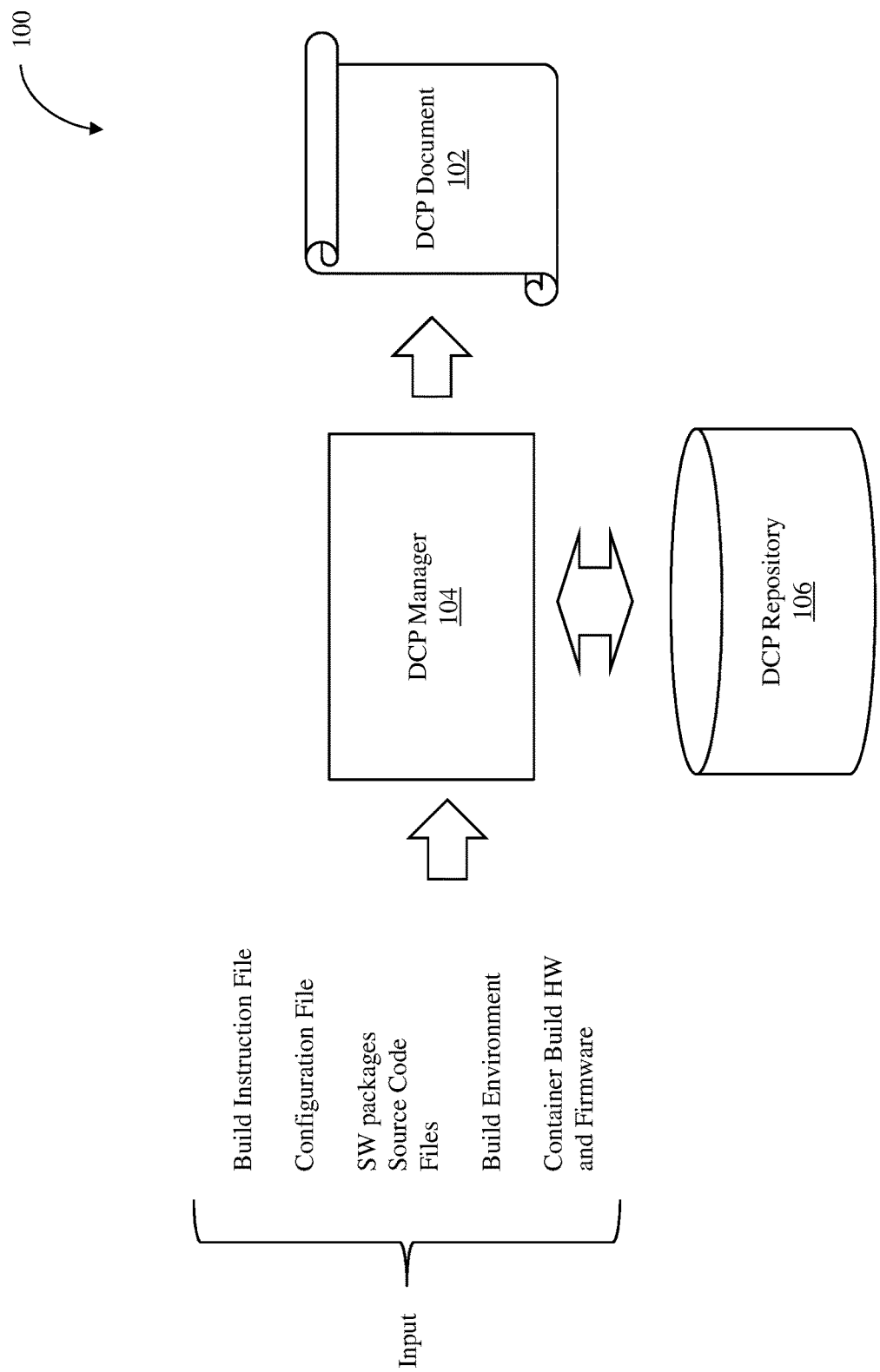
FIG. 1 is a block diagram of a deep container provenance (DCP) system in accordance with an embodiment of the invention.

FIG. 1 shows a deep container provenance (DCP) system 100 in accordance with an embodiment of the invention. As explained in detail below, the DCP system operates to generate DCP documents 102 for containers, which can provide much needed information regarding the containers, such as the exact software packages that are wrapped in each of the containers to ensure reproducibility and security. The DCP documents can then be used to answer questions regarding the corresponding containers, such as license compliance, audit questions (who built on what and when), which packages are included and their versions, and whether the containers are vulnerable to a newly identified security vulnerability. Thus, the DCP system allows for trusted sharing and collaboration between information technology (IT) administrators with respect to containers, as well as providing sufficient information to reproduce the container image.

A "container" is a package that relies on virtual isolation at the operating system level to deploy and run applications that access a shared operating system (OS) kernel. Containers can be used to wrap up an application into its own isolated environment. For the application in a container, the application has no knowledge of any other applications or processes that exist outside of its environment. Everything the application needs to run successfully is also exists in the container. Thus, the container can move, the application will always be able to run successfully because the application is bundled up with everything it needs to run. An example of a container is the container created using a Docker engine made available by Docker, Inc., which may run on Linux or Windows OS.

A container is a collection of processes that are given an isolated environment and access to resources provided by the operating system. The kernel makes use of 3 features for this: Namespaces, Cgroups and Union Filesystems. Kernel namespaces provide process isolation for containers. Cgroups provide a way to limit the resources that the processes uses. Filesystems are provided as layers and assembled together so that the processes see one filesystem on which to operate.

A base filesystem is usually created by a software build and release pipeline using tools, such as Linuxkit or Yocto etc., and can be thought of as a "container OS". The filesystem tarball then gets packaged with metadata into a container image tarball, which can be pushed to a container image repository, such as Dockerhub. From there, derivative containers can be built by augmenting the base filesystem with other filesystems. This is done by running shell commands against a copy-on-write layer created on top of the base filesystem and then saving the resulting filesystem delta to a cache.

Although this method of filesystem distribution allows for easy creation of a container image, it is difficult to ascertain what software the filesystems contain. Very few container image maintainers provide detailed documentation of the packages within their image and the shell commands used during creation, which may make use of unofficially hosted binary builds, or an actively being developed upstream project. As a result, containers can vary from build to build. With little to no knowledge of what exactly took place during a container build, compliance assertions become difficult. Thus, there is a need for a provenance for each container that is available to developers and users.

A provenance of a container must include information that captures any variation from one container to the next. Thus, all sources of container variability, both implicit and explicit, should be identified to be included in a container provenance. As an example, two container images can be built on different days with the build hardware and environment being exactly the same. Then, their hash code would be same for all their ingredients with respect to both layer order and contents of each layer, even their specific versions. In this example, only their build dates should be different. These container variability sources include (1) the filesystem layers of a container, (2) the declarative file of a container, (3) the configuration specification of a container, (4) the custom source code or binary loaded in a container, (5) the container build environment, and (6) the container build hardware and its firmware, as explained below.

(1) Filesystem Layers of a Container

Containers are layered differential file systems. Each container is an image with a readable/writeable layer on top of one or more read-only filesystem layers. The readable/writeable layer of a container includes changes made to that layer. When a new container image is created from an existing container, the original readable/writeable layer becomes the latest read-only filesystem layer. These filesystem layers will vary in different containers. As such, the exact contents of each filesystem layer of a container should be included in a provenance for that container.

(2) Declarative File of a Container

A container may be associated with a declarative file, which contains all the commands a user used to assemble the container image. Thus, such a declarative file can be viewed as being a build instruction file for a container. An example of a declarative file associated with a container is a Dockerfile. A declarative file essentially specifies a starting container image followed by steps to build each of the subsequent layers using commands either to upgrade the package repository, execute code, add external files or introduce an entry point. For example, a command in a Dockerfile may be used to update the package repository (from the web) and install the latest library/package of some software, for example, openSSL. The same Dockerfile can be used to create different images depending upon when it is executed because one or more of the packages it is installing may have been updated. However, because declarative files in their general form do not require that individual software package versions be explicitly specified, container provenance cannot be a declarative file alone.

(3) Configuration Specifications of a Container

Container specifications may have a "config" component, where the user specifies which version of a software package to install from among available options to produce the desired container image. This feature is valuable in creating slightly different container images to possibly test functionality and/or performance with respect to different versions of software packages. As such, a container provenance should comprehend the configuration specifications of a container.

(4) Custom Source Code or Binaries Loaded in a Container

Containers can carry applications, that might contain custom code or binaries housed in a remote software repository, such as a github or gitlab, the local file system, or on someone's development environment. Such custom source code and binaries can be injected into the container during build time, and thus, a container provenance should include information regarding any custom source code or binary loaded.

(5) Container Build Environment

The build environment for a container may be distinct from the deployment environment to keep the container footprint small. For instance, the build environment would contain a compiler for source code compilation, different compiler flags for various optimizations, Software Development Kits (SDK), and other tools, such as static analysis tools for security testing, memory leaks etc. Thus, a container provenance should capture this information regarding container build environment.

(5) Container Build Hardware and its Firmware

The container build hardware and its firmware (BIOS, Network and other peripheral device firmware) may have security vulnerabilities. For example, if the container build hardware includes a trusted platform module (TPM), then the container build hardware may be more trustworthy.

The DCP system 100 considers each of these variability aspects for deep container provenance generation. Thus, the DCP system is able to provide container provenances that are complete. As shown in FIG. 1, the DCP system includes a DCP manager 104 and a DCP repository 106. The DCP manager operates to receive various input regarding container images being created and to process the inputs to generate and output DCP documents 102 for the container images. The input used by the DCP manager may include a build instruction file, a configuration file, software (SW) packages, source code, files, build environment information, and container build hardware (HW) and firmware for a container image. The DCP repository 106 is used to store the container images and the associated DCP documents.

Figure 2:
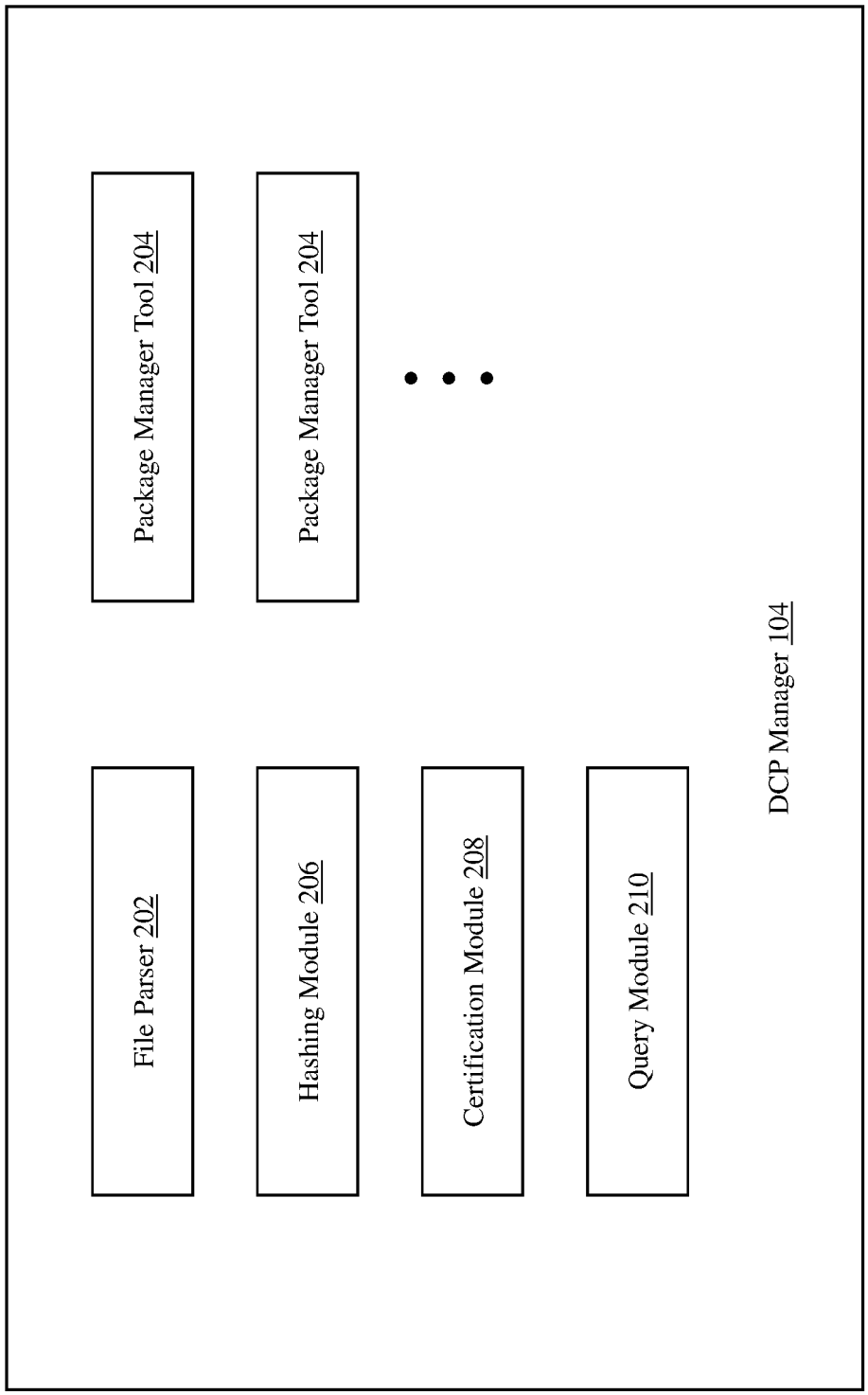
FIG. 2 illustrates components of a DCP manager of the DCP system in accordance with an embodiment of the invention.

Turning now to FIG. 2, components of the DCP manager 104 in accordance with an embodiment are shown. As shown in FIG. 2, the DCP manager includes a file parser 202, a number of package manager tools 204, a hashing module 206, a certification module 208 and a query module 210. These components of the DCP manager may be implemented as software running on one or more physical computer systems, which include physical components commonly found in a server or a personal computer, such as memory and one or more processors. In some embodiments, some or all of the components of the DCP manager may be implemented as software running on one or more virtual computers, such as virtual machines (VMs) or containers.

Figure 3:
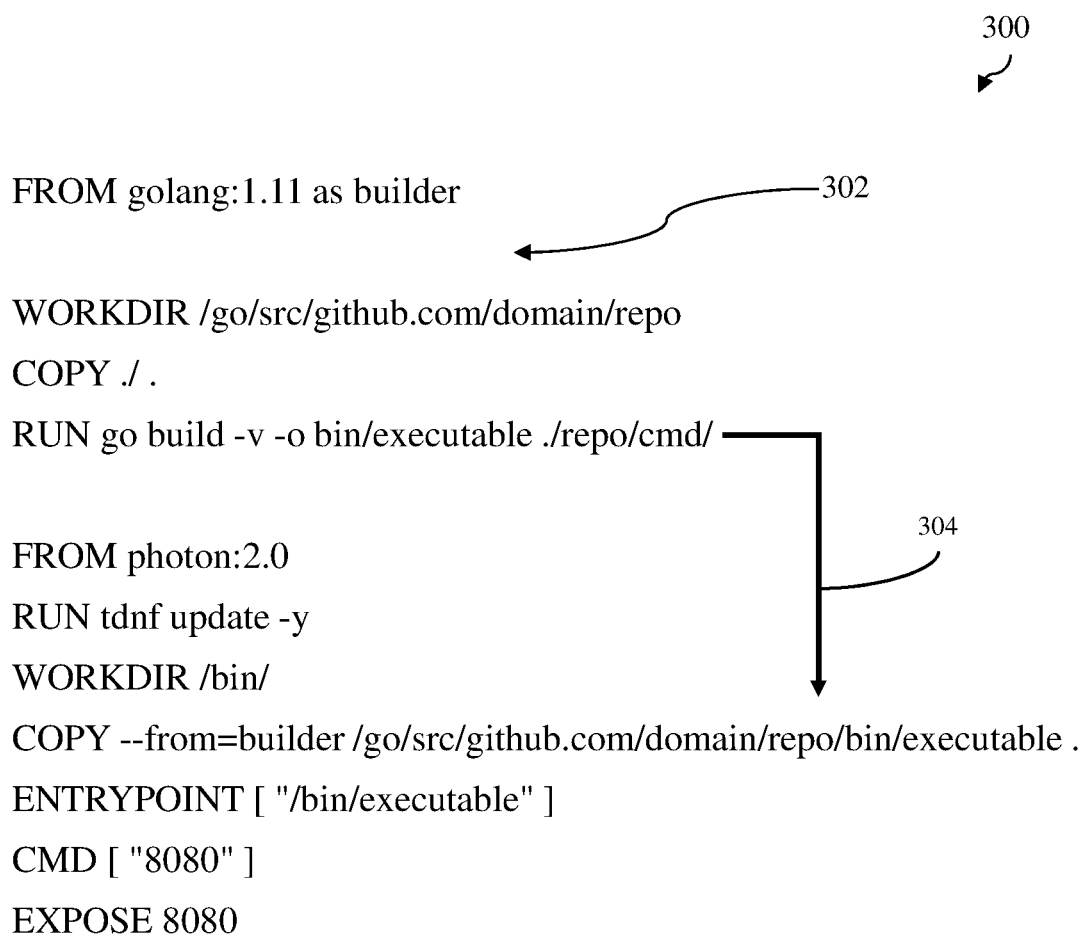
FIG. 3 illustrates a Dockerfile for a Golang application, which is an example of a build instruction file that can be used by the DCP manager in accordance with an embodiment of the invention.

The file parser 202 of the DCP manager 104 operates to parse a build instruction file of a container image, such as a Dockerfile. Thus, the file parser is able to differentiate and select different file system layers described in the build instruction file for the container image. An example of a build instruction file 300 is shown in FIG. 3. The build instruction file illustrated in FIG. 3 is a Dockerfile for a Golang application. The build instruction file includes application dependencies 302. As illustrated by the arrow 304, the application compiled with the dependencies is copied over to a new container.

The package manager tools 204 of the DCP manager 104 operate to automatically retrieve information regarding software packages or programs found in any of the file system layers of a container image described in the build instruction file. Each package manager tool is configured to retrieve information for one or more specific types of software packages. The information retrieved for each software package may include the software package name, the version of the software package, the package hash, the Uniform Resource Locator (URL) from which the software package can be found or downloaded and the license for the software package. Examples of package manager tools and associated commands to retrieve information regarding software packages or programs, and the build environment are listed below.

1. Apt. Debian package manager (Ubuntu operating system uses apt)
   a. >apt-get update
   b. >apt-get install foo
2. Rpm. RedHat package manager
3. Jar. Java archive
   a. jar xvf foo.jar//to extract with verbose flag on
4. tar. Tar balls.//captures the code and directory structure and builds a bundle
   a. tar cvf foo.tar <some directory>
   b. tar xvf foo.tar//to extract a tar ball
5. pip—Python package/library manager.
   Pypi is a repository for Python. There are others too.
6. dockerhub. —container registry_https://docs.docker.com/docker-hub/7.
7. git and git tools
   git version control system for tracking changes and facilitating collaboration
   github==software development platform.
8. >uname-a//to get operating system kernel information . . . used on a build machine
   >cp for copy
   >chmod to change file permissions
   >export FOO="foo". To set up environment variables
9. Hardware—Trusted Platform Module: TPM
   25 registers that carry hash codes of the measured installed kernel, bios, etc
10. Build environment—build tools like compilers (gcc) and linkers, docker compose along with their versions and flags.
11. Node.js and nvm. Node.js is for javascript, the version that is often used on server backends versus front end web user interface applications. Nvm is the node version manager.

The hashing module 206 of the DCP manager 104 operates to generate various hashes, which are chained together and appended to DCP documents that are generated by the DCP manager. The hashing module may use one or more hash functions to generate the various hashes, such as a hash of a source code bundle, a hash of a git clone, a hash of the build instruction file, a hash of a configuration file, and a hash of build machine information. In a particular implementation, the hashing module uses one hashing function for all hashing operations. As an example, SHA 256 may be used for the hashing operations, which has less chance of collisions than MD5.

The certification module 208 of the DCP manager 104 operates to sign the DCP documents that are generated by the DCP manager using associated private key and certificate, which are stored in a secure store accessible to the certification module. In an embodiment, the certification module may use public key infrastructure (PKI) to sign and certify the DCP documents.

The query module 210 of the DCP manager 104 operates to allow a user to ask questions about a container image and to provide answers to those questions using the associated DCP document. Thus, a user can enter a query regarding any aspect of a container image and the query module will read the associated DCP document to provide an appropriate response using the information contained in the DCP document. The types of questions that can be answered by the query module are described in detail below.

Turning back to FIG. 1, the DCP repository 106 of the DCP system 100 is used to store container images and associated DCP documents, which may be labeled using any identifiers. In an embodiment, the container images may be indexed not just by human assigned labels but also by their hash codes in the DCP documents. The DCP documents stored in the DCP repository may be used by the DCP manager to create other DCP documents, which may rely on existing DCP documents for similar container file system layers.

Figure 4A:
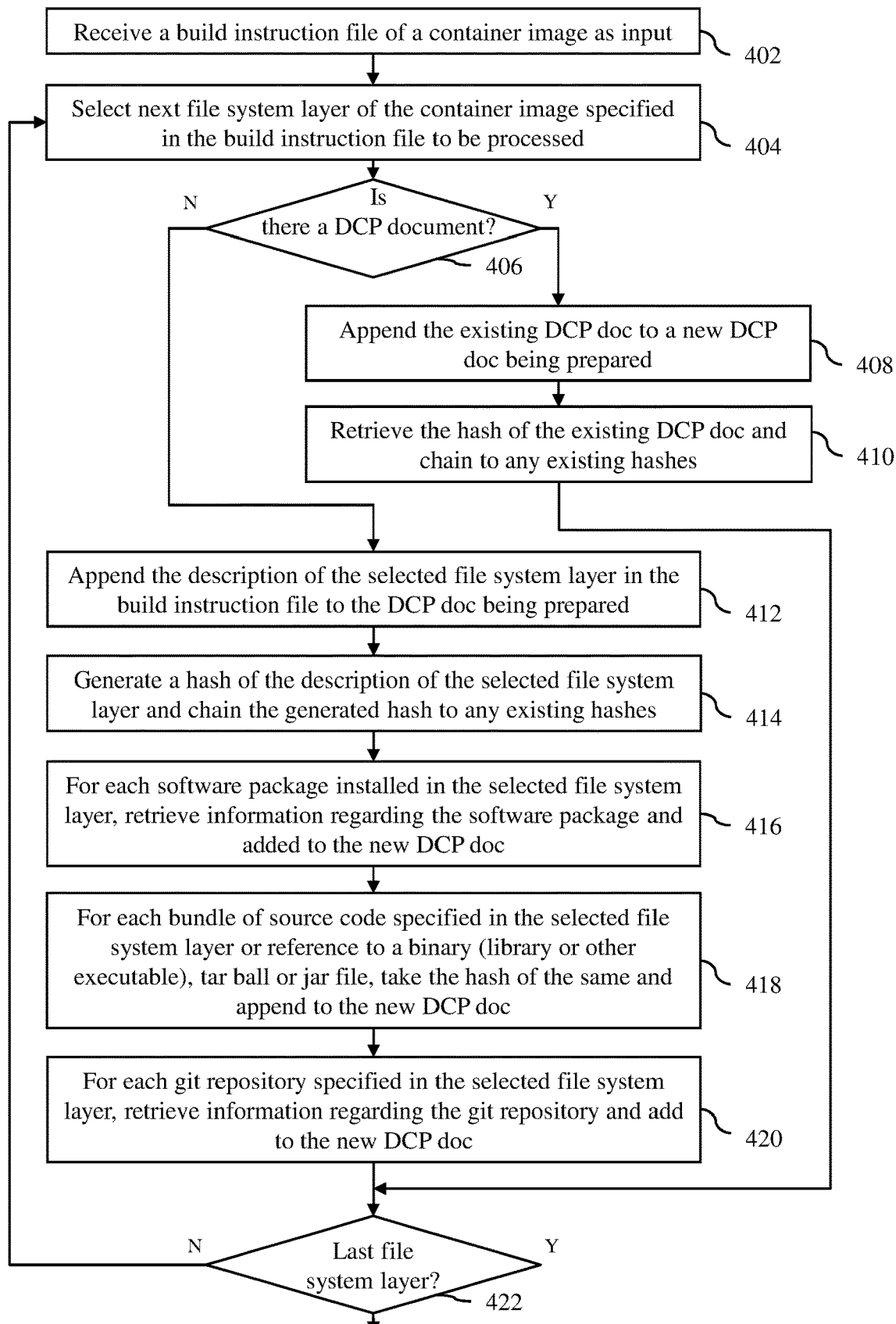
FIGS. 4A and 4B show a process flow diagram of the operation of generating a DCP document for a container image by the DCP manager in accordance with an embodiment of the invention.
Figure 4B:
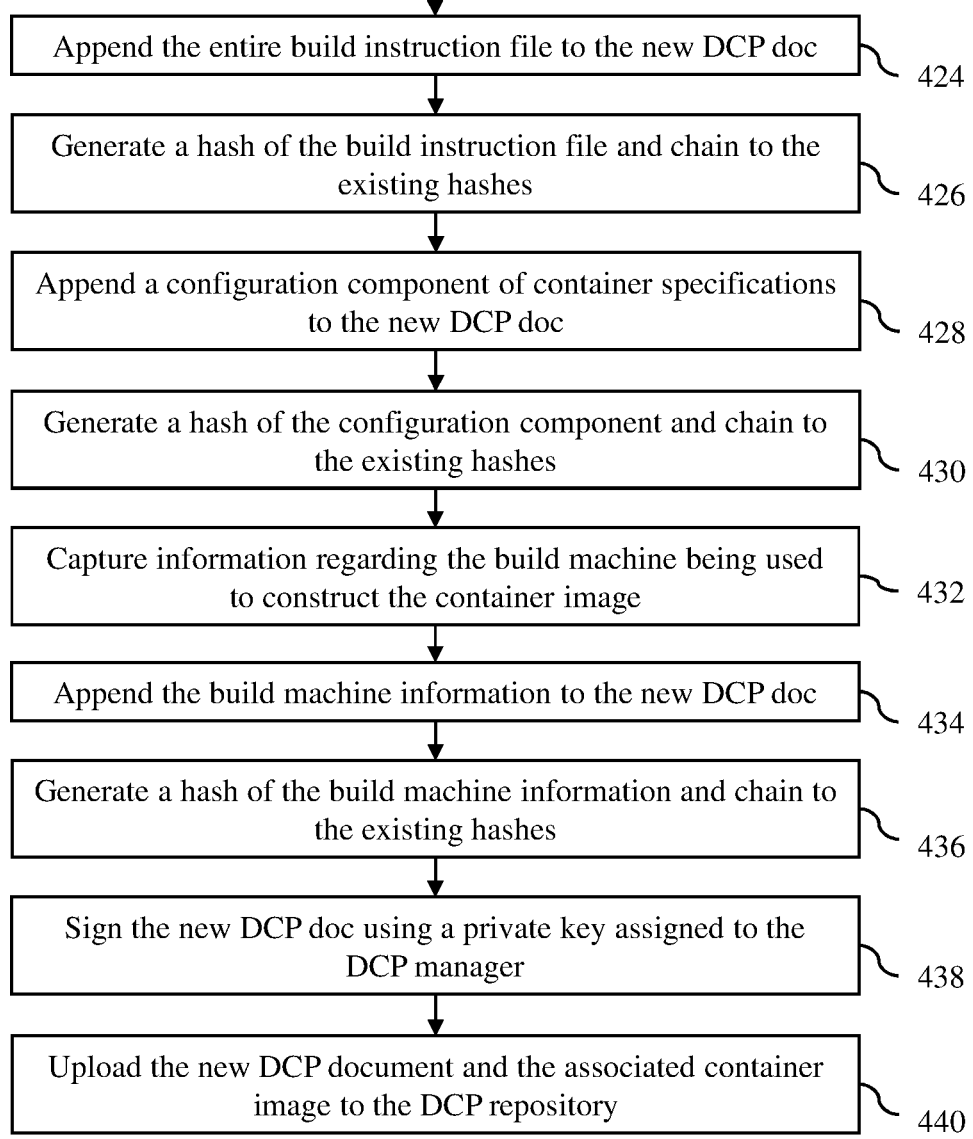

The operation of generating a DCP document for a container image by the DCP manager 104 in accordance with an embodiment of the invention is described with reference to a flow diagram of FIGS. 4A and 4B. The operation begins at block 402, where a build instruction file of the container image is received as input at the DCP manager 104. In an embodiment, the build instruction file may be a Dockerfile and the container image may be a Docker container image.

Next, at block 404, next file system layer of the container image specified in the build instruction file is selected to be processed. The first file system layer of the container image selected may be the lowest or earliest file system layer of the container image, which may be specified in the build instruction file by the lowest numerical number used for file system layers, e.g., zero or one. The next file system layer would be the next higher file system layer, and so on until the highest file system layer is selected. In an embodiment, the build instruction file may be parsed by the file parser 202 of the DCP manager 104 to find and select one of the file system layers of the container image.

Next, at block 406, a determination is made whether there is an existing DCP document for the selected file system layer. In an embodiment, this determination is made by looking for such DCP document in the DCP repository 106. If yes, then the operation proceeds to block 408, where the existing DCP doc for the selected file system layer is appended or added to a new DCP document being prepared. Next, at block 410, a hash of the existing DCP document is received and chained to any existing hashes. Any hash function may be used to generate any of the hashes used for the new DCP document. In an embodiment, any of these hashes are generated and chained by the hashing module 206 of the DCP manager 104 using a particular hash function. The operation then proceeds to block 422.

However, if at block 406, it is determined that there is no existing DCP document for the selected file system layer, then the operation proceeds to block 412, where the description of the selected file system layer in the build instruction file is appended or added to the new DCP document being prepared. Next, at block 414, a hash of the description of the selected file system layer is generated and chained to any existing hashes.

Next, at block 416, for each software package installed in the selected file system layer, information regarding the software package is retrieved and added to the new DCP document. As an example, information regarding a software package may include the software package name, the version of the software package, the package hash, the Uniform Resource Locator (URL) from which the software package can be found or downloaded and the license for the software package. In an embodiment, the information regarding each software package may be retrieved using one or more package manager tools 204 of the DCP manager 104.

Next, at block 418, for each bundle of source code specified in the selected file system layer, or reference to a binary (library or other executable), tar ball or jar file, the hash of the same is taken and appended to the DCP document. Often times, on a software download site, the distributor/vendor also publishes the hash, and the user is encouraged to download the code and compute the hash and confirm that it matches the published hash value to establish that the data is not corrupted/tampered. A binary is source code that has been compiled and is ready to execute. A library common functionality used by one or more applications is also typically supplied as a binary but if code was provided one would compile, link and use. For example, a cryptography library might be used by an email program, a storage program or a chat client to encrypt/decrypt information.

Next, at block 420, for each git repository specified in the selected file system layer, information regarding the git repository is retrieved and added to the new DCP document. As an example, information regarding a git clone may include the URL from which the git clone can be found or downloaded, the hash of the code, and the license for the code. In an embodiment, the information regarding each git clone may be retrieved using git tools by the DCP manager 104.

Next, at block 422, a determination is made whether the current selected file system layer is the last file system layer in the build instruction file. If no, the operation proceeds back to block 404, where another (next/adjacent) file system layer in the build instruction file is selected to be processed. If yes, then the operation proceeds to block 424.

At block 424, the entire build instruction file is appended or added to the new DCP document. Thus, the new DCP document will include all the information in the build instruction file. Next, at block 426, a hash of the build instruction file is generated and chained to the existing hashes.

Next, at block 428, a configuration component of the container specifications is appended or added to the new DCP document. In an embodiment, the configuration component may be one or more configuration files, which may be appended to the new DCP document in a structured text format. At block 430, a hash of the configuration component is generated and chained to the existing hashes.

Next, at block 432, information regarding the build machine being used to construct the container image is captured. The information regarding the build machine may include kernel and software packages installed on the build machine. If the build machine has a trusted platform module (TPM), environment measurements as captured in the TPM registers are chained as part of the DCP document. If the build machine is a virtual machine, information regarding the virtual machine image is appended to the DCP document. In an embodiment, the information regarding the build machine may be captured by a listing of the BIOS version number, URL, firmware, version number etc. Their contents are hashed in addition to the listing being hashed. At block 434, the build machine information is appended or added to the new DCP document. At block 436, a hash of the build machine information is generated and chained to the existing hashes.

Next, at block 438, the DCP document is signed using a private key assigned to the DCP manager 104. In an embodiment, the new DCP document is signed by the certification module 208 of the DCP manager 104 using PKI, that is the private key of a public-private key pair.

Next, at block 440, the new DCP document and the associated container image are uploaded to the DCP repository 106. The container image with its DCP document can then be distributed to other parties, such as customers, partners and/or collaborators.

Below is a pseudo-code of an algorithm for generating and distributing a DCP document in accordance with an embodiment of the invention. In this algorithm, without loss of generality, it is assumed that the container is a Docker container having a Dockerfile.

```
1.  Input <- Dockerfile, config, build-machine, source-code, packages
2.  pDoc = Null; pHash = Null
3.  for i = 0 to number-of-layers(docker-file) {
4.      layer = get_layer(Dockerfile,i)
5.      if (nil != (pDoc_layer = cache.get(label(layer))) ) { //exists in cache chain it
6.          pDoc.append(doc(pDoc_layer)) // append doc
7.          pHash = hash(pHash, hash(pDoc_layer)) // chain hash
8.      } else {
9.          // for each append doc, chain hash
10.         for each package installed // append doc, chain hash
11.             layer_doc = doc(package-name, version, package-hash, url, license)
12.         for each source code bundle | library // custom code and libraries
13.             layer_doc = doc(hash-of-code tar ball) or library binary
14.         for each git repository
15.             layer_doc = doc(git url, git clone hash, license)
16.     } //
17. }
18. Dockerfile - Append doc and chain hash // captures commands
19. Config - Append doc and chain hash
20. Build Machine - append doc and chain hash
// captures build machine and trust
        1. BIOS version, and hash
        2. kernel version and hash ,
        3. firmware version and hash for each attachment (network interface cards,
           graphics cards etc.)
        4. TPM value // if it exists
        5. VM image hash // if it exists
21. Sign the document using a private key
22. Upload container image after associating the provenance meta data
23. Distribute container image to customers/partners/collaborators with its
    provenance data
```

In the above pseudo-code, line 1 describes inputs that are received to generate the DCP document. Line 2 shows that variables pDoc (for the new DCP document) and pHash (for the hashes in the new DCP document) are both set as null. Lines 3-7 describes the process if there exists a DCP document for any of the file system layers of the container image. Lines 8-17 describes the process of getting information regarding any installed software packages, source code bundles, and git clones for each of the file system layers of the container image. In addition, hashes of these software components are generated and chained to any existing hashes in the new DCP document. Hash chaining is a well-established technique, which is also used in blockchains. Line 18 describes appending the Dockerfile to the new DCP document and chaining the hash of the Dockerfile to the other hashes. Line 19 describes appending the configuration file to the new DCP document and chaining the hash of the configuration file to the other hashes. Line 20 describes appending information regarding the build machine and chaining the hash of the information to the other hashes. Line 21 describes signing the new document using a private key. Typically, a public-private key pair will be assigned to the DCP manager 104, itself signed by some well-known certificate authority. With Public Key Infrastructure (PKI), the private key is used to sign, essentially encrypting the hash of the document using the private key and confirming the signature by decrypting it using the public key and confirming that the computed document hash matches the same. Line 22 describes uploading the container image after associating the provenance metadata, i.e., the new DCP document. Line 23 describes distributing the container image to customers/partners/collaborators with its provenance data, i.e., the associated DCP document.

The DCP documents generated by the DCP manager 104 may be used to answer questions regarding the associated container images. As noted above, the query module 210 of the DCP manager 104 can provide answers to questions regarding a container by searching the contents of a DCP document associated with that container. Thus, the DCP manager that is used to answer container questions using a DCP document may be the same DCP manager used to generate that DCP document or a different DCP manager.

The questions that can be answered by the DCP manager 104 using DCP documents includes questions regarding (1) vulnerabilities of the associated container, such as one or more Common Vulnerabilities and Exposures (CVE) identifiers, (2) build machine, such as whether the build machine is a trusted build machine and whether there is any TPM signature, (3) software licenses, such as the type of licenses that exist for software packages included in the container, e.g., General Public Licenses (GPLs), Affero General Public Licenses (AGPLs) or commercial software licenses, (4) software packages included in the container, such as software names, software versions and links to source repositories, (5) container creation, such as container provider and build date of the container, and (6) the DCP manager used to generate the DCP document, such as version and code of the DCP manager, host signature and certificate. The DCP manager may be able to answer other container questions using DCP documents, as long as the answers are contained in the DCP documents. Thus, the questions that can be answered by the DCP manager using DCP documents are only limited by the contents of the DCP documents.

Figure 5:
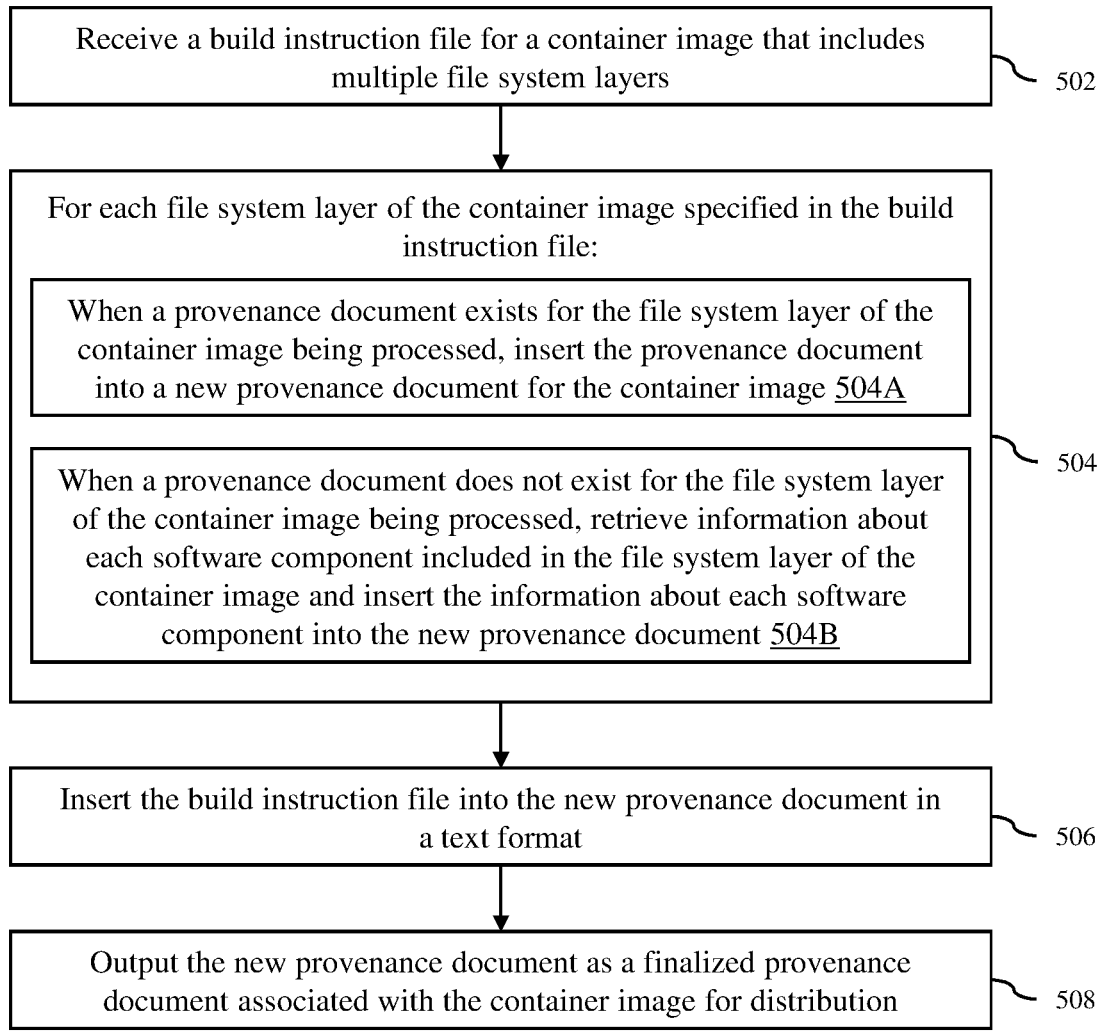
FIG. 5 is a flow diagram of a computer-implemented method for container provenance tracking in accordance with an embodiment of the invention.

A computer-implemented method for container provenance tracking in accordance with an embodiment of the invention is described with reference to a flow diagram of FIG. 5. At block 502, a build instruction file for a container image that includes multiple file system layers is received. At block 504, for each file system layer of the container image specified in the build instruction file: when a provenance document exists for the file system layer of the container image being processed, the provenance document is inserted into a new provenance document for the container image (block 504A); and when a provenance document does not exist for the file system layer of the container image being processed, information about each software component included in the file system layer of the container image is retrieved and inserted into the new provenance document (block 504B). At block 506, the build instruction file is inserted into the new provenance document in a structured text format. At block 508, the new provenance document is outputted as a finalized provenance document associated with the container image for distribution.

The components of the embodiments as generally described in this document and illustrated in the appended figures could be arranged and designed in a wide variety of different configurations. Thus, the description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for container provenance tracking, the method comprising:
   receiving a build instruction file for a container image that includes multiple file system layers;
   for each file system layer of the container image specified in the build instruction file:
      when a provenance document exists for the file system layer of the container image being processed, inserting the provenance document into a new provenance document for the container image; and
      when a provenance document does not exist for the file system layer of the container image being processed, retrieving information about each software component included in the file system layer of the container image and inserting the information about each software component into the new provenance document;
   inserting the build instruction file into the new provenance document in a structured text format;
   signing the new provenance document using private key and certificate before the new provenance document is finalized; and
   outputting the new provenance document as a finalized provenance document associated with the container image for distribution.

2. The computer-implemented method of claim 1, further comprising inserting a configuration file into the new provenance document in the structured text format.

3. The computer-implemented method of claim 1, further comprising extracting information about a build environment for the container image and inserting the information about the build environment into the new provenance document.

4. The computer-implemented method of claim 3, wherein the information about the build environment includes information about build hardware and firmware.

5. The computer-implemented method of claim 1, wherein retrieving information about each software component included in the file system layer of the container image includes employing a software tool to access a software component included in the file system layer.

6. The computer-implemented method of claim 5, wherein the software component includes a software package, source code or a file.

7. The computer-implemented method of claim 1, further comprising maintaining hash for the new provenance document by chain hashing.

8. The method of claim 1, further comprising responding to user questions about the container image with answers using the finalized provenance document to find the answers to the user questions.

9. A non-transitory computer-readable storage medium containing program instructions for container provenance tracking, wherein execution of the program instructions by one or more processors of a computer system causes the one or more processors to perform steps comprising:
receiving a build instruction file for a container image that includes multiple file system layers;
for each file system layer of the container image specified in the build instruction file:
when a provenance document exists for the file system layer of the container image being processed, inserting the provenance document into a new provenance document for the container image; and
when a provenance document does not exist for the file system layer of the container image being processed, retrieving information about each software component included in the file system layer of the container image and inserting the information about each software component into the new provenance document;
inserting the build instruction file into the new provenance document in a structured text format;
signing the new provenance document using private key and certificate before the new provenance document is finalized; and
outputting the new provenance document as a finalized provenance document associated with the container image for distribution.

10. The non-transitory computer-readable storage medium of claim 9, wherein the steps further comprise inserting a configuration file into the new provenance document in the structured text format.

11. The non-transitory computer-readable storage medium of claim 9, wherein the steps further comprises extracting information about a build environment for the container image and inserting the information about the build environment into the new provenance document.

12. The non-transitory computer-readable storage medium of claim 11, wherein the information about the build environment includes information about build hardware and firmware.

13. The non-transitory computer-readable storage medium of claim 9, wherein retrieving information about each software component included in the file system layer of the container image includes employing a software tool to access a software component included in the file system layer.

14. The non-transitory computer-readable storage medium of claim 13, wherein the software component includes a software package, source code or a file.

15. The non-transitory computer-readable storage medium of claim 9, wherein the steps further comprise maintaining hash for the new provenance document by chain hashing.

16. The non-transitory computer-readable storage medium of claim 9, wherein the steps further comprise responding to user questions about the container image with answers using the finalized provenance document to find the answers to the user questions.

17. A system comprising:
memory; and
at least one processor configured to:
receive a build instruction file for a container image that includes multiple file system layers;
for each file system layer of the container image specified in the build instruction file:
when a provenance document exists for the file system layer of the container image being processed, insert the provenance document into a new provenance document for the container image; and
when a provenance document does not exist for the file system layer of the container image being processed, retrieve information about each software component included in the file system layer of the container image and insert the information about each software component into the new provenance document;
insert the build instruction file into the new provenance document in a structured text format;
sign the new provenance document using private key and certificate before the new provenance document is finalized; and
output the new provenance document as a finalized provenance document associated with the container image for distribution.

18. The system of claim 17, wherein the at least one processor is configured to employ a software tool to access a software component included in the file system layer to retrieve information about the software component.

19. The system of claim 17, wherein the at least one processor is configured to insert a configuration file into the new provenance document in the structured text format.

20. The system of claim 17, wherein the at least one processor is configured to extract information about a build environment for the container image and inserting the information about the build environment into the new provenance document.

* * * * *